Patented Apr. 4, 1939

2,153,318

UNITED STATES PATENT OFFICE 2,153,318

PROCESS FOR PRODUCING RESINLIKE CONDENSATION PRODUCTS

Kurt Stickdorn, Rosslau, Anhalt, Germany, assignor to Deutsche Hydrierwerke Aktiengesellschaft, Berlin-Charlottenburg, Germany, a corporation of Germany No Drawing. Application September 27, 1935, Serial No. 42,461. In Germany September 27, 1934

6 Claims. (Cl. 260—100)

It has been already practicable in different ways to make neutral artificial resin-like products from natural resins e. g. from the resinic acids contained in the pine resin or in the copals and other natural resins, which acids, by saturating them with metallic oxides such as lime, are transformed into neutral resin-like products. Those acids were also converted with glycerine into the corresponding resinic acid glycerine ester. The thus obtained products are, however, not free from drawbacks of the initial materials, because, on the one hand, they are of a very dark colour, whilst on the other hand they do by no means meet the technical requirements as regards their hardness and elasticity. The resinic acids saturated with metallic oxides, are, moreover, absolutely unfit for many purposes on account of the metal which they contain.

Now it has been found that resin-like products of a brittle hardness or also of a certain softness and nearly as clear as water are obtainable in converting natural resin esters or resinic acids into resin-like products of an alcoholic character by a catalytic or by other reduction procedures, and in condensing same with organic or inorganic acids. The reduction of the resin esters or of the resinic acids to the corresponding alcohols may be done, on the one hand, in the way of catalytic high-pressure-hydrogenation, but on the other hand, likewise in an amyl- or butyl-alcoholic solution with sodium. For the catalytic high-pressure-hydrogenation in general temperatures of more than 200° C. are applied, preferably between approximately 260 to 320° C., and pressures of more than 100 atm., preferably varying between 200 and 300 atm. To this effect one may make use of the well-known hydrogenation-catalysts, such as copper-, nickel- and cobalt-catalysts either independently or mixed with one another and eventually in presence of compounds of the metals zinc, manganense, aluminium, chrome and the like as well as in combination with infusorial silica and other bearing substances. As initial products for the production of resin alcohols by the above method are to be considered the various sorts of colophony and other natural resins such as copals, sandarac, amber resin, damar-resin and the like and furthermore the fat-containing or fat- free resinic acids separated from tall-oil. For the condensing with the resin alcohols obtained from those natural resins one may advantageously use boric acid, phosphoric acid, phosphorous acid, arsenious acid and similar inorganic acids and moreover mono- or poly-basic organic acids such as lower or higher molecular fatty acids, cyclo-aliphatic or aromatic carbonic acids as well as the oxy-, keto-, amino- and halogen-derivatives of these acids e. g. acetic acid, lactic acid, glycocoll, levulic acid, capronic acid, lauric acid, stearic acid, oleic acid, ricinolic fatty acids, linseed oil acid, salicylic acid, cinnamic acid, hydro-cinnamic acid, pyromucic acid, oxalic acid, amber acid, sebacic acid, tartaric acid, adipic acid, phthalic and hydro-phthalic acid and the like either alone or mixed with one another. In certain cases the resinic acids or common colophony or also the naphthenic acids are likewise suitable as acid-components. Furthermore it is stated that for the condensing process one may usefully co-employ other alcohols such as glycol, glycerine ricinolic alcohol, higher molecular fatty alcohols, napththenic alcohols and the like besides the resin alcohols already present in the mass.

The condensing of the resin alcohols with the acids can be performed in a good technical manner, generally by melting the components together and by heating for a short or longer time up to temperatures exceeding 100° C., preferably between 120 and 250° C., whereby the through-passing of an indifferent gas-stream has proved useful in order to accelerate the condensing process. It is also practicable to promote the condensation by the addition of little amounts of well-known catalysts.

The resin-like condensation products are, according to their composition and the way in which they are made, light and even colourless resins that distinguish themselves by perfect homogeneity and transparency and some of them also by a high melting point and good solubility in drying-oils and solvents. They are useful in any resin-consuming industry e. g. for the manufacture of oil-, resin-, cellulose-, chlor-caoutchouc- and combined lacquers, in the varnish industry, serving as sliding-preventive for polishing-waxes and driving-belt-waxes, for the manufacture of sizes such as paper-sizes, lutes, all sorts of adhesive substances, for the producing of intaglio-colours and as binding agents for printing-colours of any kind and also for leather- and fabric-printing and the like, for the manufacture of solid greases, adhesive fats and adhesive waxes, drawing fats, for the impregnation of textiles and other materials, for the manufacture of fly-catchers and of means against the damaging pest such as caterpillars-glue, for the manufacture of grafting wax, for the manufacture of artificial articles and of artificial masses made of cellulose derivatives, alkyd- or phenol-formaldehyde-resins, hardened albuminous stuffs, natural and artificial waxes, natural and artificial caoutchouc- and asphalt-products, hardened, sulfurised oils or oils treated with chlorine and the like.

Example 1

Colophony is submitted to the catalytic high-pressure hydrogenation in treating it with hydrogen in presence of a copper-manganese-aluminium-catalyst at a temperature of 260–320° C. under a pressure of 250 atm. In this way one obtains a resin-alcoholic product which is as clear as water. 28 weight-parts of this resin alcohol, that boils at 3 mm. between 180 and 230° C. and possesses an acetyl-saponification number of 170, are heated up to 150° C. for 5 hours, together with 6 parts of boric acid, while letting pass a stream of nitrogen or carbon-dioxide through the mass. In this way an acid-free resin is obtained with a melting point of 78° and clear as water; it is able of dissolving itself and of becoming quite transparent in any oil and solvent below 100° C. From this resin product, in combination with standing oils, one obtains lacquers which, when dried, are hard, elastic and bright.

Example 2

In condensing 42 parts of the same resin alcohol as specified in Example 1 at 240° C. for 12 hours, together with 39 parts of lightest colophony and with an addition of 1 part of boric acid serving as catalyst, while a nitrogen stream is passing through, one obtains a nearly neutral and a clear resin-product, the melting point of which is 90° C. This resin product is excellent e. g. as binding agent in the manufacture of non-sticking and quickly drying printing colours. The thus obtained resin is also suitable for the producing of impregnations for wax-clothes and of linoleum-covering masses and the like.

Example 3

"Tall"-oil resinic acids free of fatty acids and sulfur compounds are treated in a high-pressure autoclave at 300° C. under a pressure of 250 atm. in presence of a copper-zinc-manganese-catalyst with hydrogen. The product obtained, after the working-up, is a resin alcohol of $Kp_2=185$–$215°$, that allows of being distilled clear as water and which solidifies in the cold while partly crystallizing. 14 weight-parts of this resin alcohol are heated up to 180° for 10 hours, together with 4,5 parts of phthalic acid. The thus obtained resin, which is nearly as clear as water, forms an excellent mean for the manufacture of bright enamel lacquers.

Example 4

2 mols of resin alcohol, obtainable by high vacuum distillation of the high-pressure hydrogenation produce from Congocopal with the acetyl-saponification number 122, saponification number 9 and melting point 105° and representing a colourless non-sticking substance, are heated up to 175° for 8 hours together with 2 mols of tartaric acid and 1 mol of glycerine after an addition of 1/20 mol of boric acid, in the stream of nitrogen. The thus obtained condensation product is very superior to the natural copals and other well-known resins with regard to the degree of clearness, hardness and solubility in oils and spirit and it is advantageously used for the manufacture of cellulose-combination-lacquers.

Example 5

Technical damar-resin is converted into a damar-resin alcohol as clear as water by means of high-pressure reduction with a copper-zinc-catalyst under a high hydrogen pressure and at a high temperature; this damar resin alcohol possesses the following constants: acetyl-saponification number 120, saponification number 6, acid number 1, melting point 88°. It is condensed with phthalic acid to a yellowish artificial resin, the melting point of which is 150° C. This artificial resin allows of being used with great advantage in the manufacture of best oil lacquers.

Example 6

290 weight-parts of resin alcohol obtained from damar resin by the high-pressure reduction as specified in Example 5, are heated up to 180° for 15 hours, together with 120 parts of benzoic acid and an addition of 2 parts of boric acid, while letting pass through an inert gas stream. The thus obtained product is a light yellow resin body that serves e. g. for co-employment in producing nitro-cellulose covering lacquers which are particularly clear.

I claim:

1. A process for producing resin-like condensation-products comprising the reduction of materials selected from the group consisting of natural resins and resin-acids to produce products of alcoholic character and the condensation of these products with inorganic acids in the presence of a catalyst.

2. A process for producing resin-like condensation-products comprising the reduction of materials selected from the group consisting of natural resins and resin-acids to produce products of alcoholic character and the condensation of these products with inorganic acids of the group consisting of boric acid, phosphoric acid, phosphorous acid, arsenious acid.

3. A new product consisting of the reduction product of colophony of alcoholic structure condensed with boric acid.

4. A new product consisting of the reduction product of colophony of alcoholic structure condensed with an acid of the group consisting of boric acid, phosphoric acid, phosphorous acid and arsenious acid.

5. A substantially water clear artificial resin consisting of the product of the reaction of the reduction product of a resin of the group consisting of copals and colophony having an alcoholic character with an acid of the group consisting of boric acid, phosphoric acid, phosphorus acid and arsenious acid.

6. A new product consisting of an alcoholic reduction product of material selected from the group consisting of natural resins and resin acids condensed with an inorganic acid of the group consisting of boric acid, phosphoric acid, phosphorus acid and arsenious acid.

KURT STICKDORN.